United States Patent
Adams et al.

(10) Patent No.: US 8,748,059 B2
(45) Date of Patent: *Jun. 10, 2014

(54) FUEL CARTRIDGE WITH FLEXIBLE LINER

(75) Inventors: Paul Adams, Monroe, CT (US);
Andrew J. Curello, Hamden, CT (US);
Floyd Fairbanks, Naugatuck, CT (US)

(73) Assignee: Societe BIC, Clichy Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/366,919

(22) Filed: Feb. 6, 2012

(65) Prior Publication Data

US 2012/0135335 A1  May 31, 2012

Related U.S. Application Data

(62) Division of application No. 11/614,270, filed on Dec. 21, 2006, now Pat. No. 8,113,227, which is a division of application No. 10/629,004, filed on Jul. 29, 2003, now Pat. No. 7,172,825.

(51) Int. Cl.
*H01M 8/04* (2006.01)
*B65D 90/04* (2006.01)
*F16K 24/04* (2006.01)

(52) U.S. Cl.
USPC ........ 429/515; 429/513; 220/495.08; 220/723

(58) Field of Classification Search
USPC ........ 429/443, 515, 513; 220/495.01, 495.08, 220/723; 383/100, 103
See application file for complete search history.

(56) References Cited

U.S. PATENT DOCUMENTS

| | | | | |
|---|---|---|---|---|
| 1,690,072 A | * | 10/1928 | Johnson | 220/721 |
| 3,286,878 A | * | 11/1966 | Schadt et al. | 220/723 |
| 3,289,051 A | * | 11/1966 | Sloan | 361/519 |
| 3,416,985 A | | 12/1968 | Dounoucos | |
| 3,447,286 A | | 6/1969 | Dounoucos | |
| 3,653,537 A | * | 4/1972 | Shiobara et al. | 220/746 |
| 3,883,046 A | * | 5/1975 | Thompson et al. | 220/723 |
| 3,949,934 A | * | 4/1976 | Goglio | 383/103 |
| 4,079,856 A | * | 3/1978 | Drake | 220/723 |
| 4,444,219 A | * | 4/1984 | Hollenstein | 383/103 |
| 4,562,123 A | * | 12/1985 | Shimizu et al. | 429/515 |
| 4,699,637 A | | 10/1987 | Iniotakis et al. | |
| 4,969,750 A | * | 11/1990 | Russo et al. | 383/113 |
| 5,171,439 A | * | 12/1992 | Vakharia | 383/100 |
| 5,354,133 A | * | 10/1994 | Rapparini | 383/103 |
| 5,506,067 A | * | 4/1996 | Tinker | 429/407 |
| 5,584,409 A | * | 12/1996 | Chemberlen | 383/103 |
| 5,976,725 A | * | 11/1999 | Gamo et al. | 429/515 |
| 5,997,594 A | | 12/1999 | Edlund et al. | |

(Continued)

*Primary Examiner* — John Rivell
(74) *Attorney, Agent, or Firm* — The H.T. Than Law Group (57) ABSTRACT

A cartridge connectable to a fuel cell is disclosed. The cartridge comprises an outer casing and an inner flexible liner containing fuel for the fuel cell. The inner flexible liner may have an insert disposed inside the inner liner to facilitate the transport of fuel from the cartridge to the fuel cell. The insert minimizes the fuel that is trapped within the cartridge. The inner flexible liner can be used without the outer casing. The outer casing can be substantially rigid or flexible. The cartridge is also adaptable to receive byproducts from the fuel cell. The cartridge can also be pressurized to push fuel to the fuel cell. Unidirectional relief valves are also disclosed to prevent internal pressure in the cartridge from becoming too high or too low.

7 Claims, 6 Drawing Sheets

(56) References Cited

U.S. PATENT DOCUMENTS

| | | | |
|---|---|---|---|
| 6,260,544 B1* | 7/2001 | Spry et al. | 220/723 |
| 6,268,077 B1* | 7/2001 | Kelley et al. | 429/421 |
| 6,319,306 B1 | 11/2001 | Edlund et al. | |
| 6,436,564 B1* | 8/2002 | Witzigreuter et al. | 383/103 |
| 6,458,189 B1 | 10/2002 | Edlund et al. | |
| 6,460,733 B2* | 10/2002 | Acker et al. | 222/94 |
| 6,506,513 B1* | 1/2003 | Yonetsu et al. | 429/515 |
| 6,527,002 B1* | 3/2003 | Szakaly | 220/723 |
| 6,610,433 B1* | 8/2003 | Herdeg et al. | 429/443 |
| 6,660,421 B2* | 12/2003 | Merin Celemin et al. | 429/454 |
| 6,681,789 B1* | 1/2004 | Moulis et al. | 220/723 |
| 6,994,932 B2* | 2/2006 | Kinkelaar et al. | 429/515 |
| 7,117,732 B2* | 10/2006 | Curello et al. | 73/149 |
| 7,147,955 B2* | 12/2006 | Adams | 429/513 |
| 7,172,825 B2* | 2/2007 | Adams et al. | 429/515 |
| 7,291,410 B2* | 11/2007 | Kinkelaar et al. | 429/515 |
| 7,401,712 B2* | 7/2008 | Kaye et al. | 429/515 |
| 7,484,275 B2* | 2/2009 | Carroll et al. | 383/103 |
| 7,622,207 B2* | 11/2009 | Kaye | 429/515 |
| 7,648,792 B2* | 1/2010 | Kaschmitter et al. | 429/424 |
| 7,674,540 B2* | 3/2010 | Adams et al. | 429/410 |
| 7,776,463 B2* | 8/2010 | Davis | 429/512 |
| 7,779,856 B2* | 8/2010 | Adams et al. | 137/210 |
| 7,837,387 B2* | 11/2010 | Newrones et al. | 383/103 |
| 7,968,250 B2* | 6/2011 | Kaschmitter et al. | 429/515 |
| 8,235,077 B2* | 8/2012 | Curello et al. | 141/347 |
| 2001/0045364 A1* | 11/2001 | Hockaday et al. | 429/41 |
| 2002/0018925 A1* | 2/2002 | Merin Celemin et al. | 429/34 |
| 2002/0197522 A1* | 12/2002 | Lawrence et al. | 429/34 |
| 2003/0008193 A1* | 1/2003 | Kinkelaar et al. | 429/39 |
| 2003/0037487 A1* | 2/2003 | Amendola et al. | 48/76 |
| 2003/0064258 A1* | 4/2003 | Pan et al. | 429/13 |
| 2003/0082427 A1* | 5/2003 | Prasad et al. | 429/34 |
| 2003/0129464 A1* | 7/2003 | Becerra et al. | 429/25 |
| 2003/0134161 A1* | 7/2003 | Gore et al. | 429/12 |
| 2003/0136453 A1* | 7/2003 | Johnson | 138/30 |
| 2004/0096610 A1* | 5/2004 | Ramanathan et al. | 428/35.7 |
| 2004/0151962 A1* | 8/2004 | Adams | 429/34 |
| 2005/0008908 A1* | 1/2005 | Kaye et al. | 429/20 |
| 2005/0074643 A1* | 4/2005 | Adams et al. | 429/19 |
| 2005/0116190 A1* | 6/2005 | Adams et al. | 251/144 |
| 2006/0014069 A1* | 1/2006 | Kaye et al. | 429/34 |
| 2006/0029848 A1* | 2/2006 | Kaye et al. | 429/25 |
| 2006/0172171 A1 | 8/2006 | Deinzer et al. | |
| 2006/0174952 A1* | 8/2006 | Curello et al. | 137/614.03 |
| 2007/0077463 A1* | 4/2007 | Adams et al. | 429/13 |
| 2007/0077470 A1* | 4/2007 | Adams et al. | 429/25 |

* cited by examiner

FUEL CARTRIDGE WITH FLEXIBLE LINER

CROSS-REFERENCED TO RELATED APPLICATIONS

The present application is a divisional application of U.S. patent application Ser. No. 11/614,270, filed on Dec. 21, 2006, and is now U.S. Pat. No. 8,113,227, which is a divisional application of U.S. patent application Ser. No. 10/629,004, filed on Jul. 29, 2003, and is now U.S. Pat. No. 7,172,825. The '270 and '004 applications are incorporated by reference herein in their entirety.

FIELD OF THE INVENTION

This invention generally relates to fuel cartridges for fuel cells, and more particularly this invention relates to disposable and refillable fuel cartridges. This invention also relates to multi-walled fuel cartridges and to fuel cartridges with flexible liners.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel and more efficient than portable power storage, such as lithium-ion batteries.

In general, fuel cell technologies include a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into three general categories, namely fuel cells utilizing compressed hydrogen ($H_2$) as fuel, proton exchange membrane (PEM) fuel cells that use methanol ($CH_3OH$), sodium borohydride ($NaBH_4$), hydrocarbons (such as butane) or other fuels reformed into hydrogen fuel, and PEM fuel cells that use methanol ($CH_3OH$) fuel directly ("direct methanol fuel cells" or DMFC). Compressed hydrogen is generally kept under high pressure, and is therefore difficult to handle. Furthermore, large storage tanks are typically required, and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. DMFC, where methanol is reacted directly with oxidant in the fuel cell, is the simplest and potentially smallest fuel cell, and also has promising power application for consumer electronic devices.

DMFC for relatively larger applications typically comprises a fan or compressor to supply an oxidant, typically air or oxygen, to the cathode electrode, a pump to supply a water/methanol mixture to the anode electrode and a membrane electrode assembly (MEA). The MEA typically includes a cathode, a PEM and an anode. During operation, the water/methanol liquid fuel mixture is supplied directly to the anode, and the oxidant is supplied to the cathode. The chemical-electrical reaction at each electrode and the overall reaction for a direct methanol fuel cell are described as follows:

Reaction at the Anode:

$$CH_3OH+H_2O \rightarrow CO_2+6H^++6e^-$$

Reaction at the Cathode:

$$O_2+4H^++4e^- \rightarrow 2H_2O$$

The Overall Fuel Cell Reaction:

$$CH_3OH+1.5O_2 \rightarrow CO_2+2H_2O$$

Due to the migration of the hydrogen ions ($H^+$) through the PEM from the anode through the cathode and due to the inability of the free electrons ($e^-$) to pass through the PEM, the electrons must flow through an external circuit, which produces an electrical current through the external circuit. The external circuit may be any useful consumer electronic devices, such as mobile or cell phones, calculators, personal digital assistants and laptop computers, among others. DMFC is discussed in U.S. Pat. Nos. 5,992,008 and 5,945,231, which are incorporated by reference in their entireties. Generally, the PEM is made from a polymer, such as Nafion® available from DuPont, which is a perfluorinated material having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

The cell reaction for a sodium borohydride reformer fuel cell is as follows:

$$NaBH_4(aqueous)+H_2O \rightarrow (heat\ or\ catalyst) \rightarrow (H_2)+(NaBO_2)(aqueous)$$

$$H_2 \rightarrow (2H^++2e^-)+O_2 \rightarrow 2H_2O(at\ the\ anode)$$

$$2(2H^++2e^-)+O_2 \rightarrow 2H_2O(at\ the\ cathode)$$

Suitable catalysts include platinum and ruthenium, among other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. Sodium borohydride fuel cell is discussed in United States published patent application no. 2003/0082427, which is incorporated herein by reference.

The patent literature discloses a number of non-pressurized and pressurized portable fuel tank or fuel storage for fuel cells. United States patent application publication no. 2002/0018925 A1 discloses an electronic device with a cavity, where a refillable balloon containing fuel is stored. This balloon is made from an elastic material. United States patent application publication no. 2003/0008193 A1 discloses a flexible walled fuel tank that contains fuel and an absorbent material.

U.S. Pat. No. 6,460,733 B2 discloses a multi-walled fuel tank comprising an inner fuel container disposed inside an outer container. The inner container may have a rigid, semi-rigid or flexible wall. The plenum area between the two containers comprises agents or additives that neutralize methanol fuel in case of breakage or before disposal. The fuel is fed to a fuel reservoir or directly to the anode electrode by gravity or by a pressurized gas source located within the outer container. An external pump is also provided to communicate the fuel to the fuel cell.

U.S. Pat. No. 6,506,513 B1 discloses, among other things, a fuel tank comprising a pressure adjusting mechanism for maintaining a constant pressure within the tank and an inner bellow containing fuel. United States patent publication nos. 2002/0197522 and 2003/0082427 disclose a fuel cartridge comprising a fuel bladder and a pressurized mechanism applied to the fuel bladder. Publication '427 further discloses a bladder adapted to receive liquid byproduct(s) from the fuel cell.

United States patent application publication no. US 2002/0127451 A1 discloses a compact PEM fuel cell that stores methanol fuel directly in contact with the PEM, and the $CO_2$ byproduct is vented to the housing to pressurize the housing. This housing further comprises a relief valve to prevent the over-pressurization of the housing, and a fuel intake valve to add fuel. This reference does not disclose a separate fuel tank or cartridge.

Recently, Neah Power Systems of Bothell, Wash., disclosed a sealed fuel tank that stores fuel as well as water and $CO_2$ byproducts in separate bladders.

However, the prior art does not disclose a fuel cartridge with a flexible inner chamber that minimizes residual fuel trapped in the inner chamber when the walls of the chamber come in contact with each other, or fuel cartridges with the advantages and features described below.

SUMMARY OF THE INVENTION

Hence, the present invention is directed to a fuel cartridge adapted for use with any fuel cell.

The present invention is also directed to a fuel cartridge adapted for use with a reformat fuel cell.

The present invention is also directed to a fuel cartridge adapted for use with a direct methanol fuel cell.

The present invention is also directed to a multi-walled fuel cartridge.

The present invention is also directed to a fuel cartridge that has a flexible inner liner.

The present invention is further directed to a fuel cartridge with at least one relief valve.

One aspect of the present invention is directed to a fuel cartridge connectable to a fuel cell or to a fuel refilling container comprising an outer casing and an inner flexible liner containing fuel for the fuel cell. The inner flexible liner has an insert disposed therein to facilitate the transport of fuel from the cartridge to the fuel cell. The insert may have flexible and/or substantially rigid ribs, and the ribs may be integrally formed with the liner. The insert may also be a foam insert or a mesh insert. The insert may also consist of a plurality of particles. The particles can be connected to each other or they can be loose. The inner liner is connected to a shut-off valve, and fuel is transported through the shut-off valve to the fuel cell.

The outer casing of the cartridge can be substantially rigid or flexible. It can also be sealed or be in fluid communication with ambient air. The outer casing can have an open structure, which can be covered with a lid, a gas permeable, liquid impermeable membrane or a liquid absorbent filler material.

The cartridge may also have a first unidirectional relief valve disposed on the outer casing. The first relief valve intermittently allows air to enter the cartridge to prevent a partial vacuum from forming within the cartridge. The first relief valve can be covered with a gas permeable, liquid impermeable membrane or a liquid absorbent filler material. Preferably, the first relief valve is a poppet-type valve.

The gas and/or liquid byproducts produced in the fuel cell can be transported to an interior space between the outer casing and the inner liner in the cartridge. The cartridge may also have a second unidirectional relief valve disposed on the outer casing and in fluid communication with the interior space. The second relief valve intermittently allows gas from inside the cartridge to vent to ambient air. The second relief valve can be covered with a gas permeable, liquid impermeable membrane or a liquid absorbent filler material. Preferably, the second relief valve is a poppet-type valve. The cartridge may have both a first and a second relief valve.

Alternatively, the outer casing has an open structure, which is covered by a gas permeable, liquid impermeable membrane or a liquid absorbent filler material. The gas byproduct can be continually vented through the open structure.

The cartridge may further have an energy-storing device to compress the inner liner. The energy-storing device can be a compressed spring, compressed foam, compressed gas such as butane, n-butane or propane, or liquid propane. The inner liner can also be compressed by an external energy-storing device, such as a compressed spring, compressed foam, compressed gas such as butane, n-butane or propane, or liquid propane, disposed inside an electronic device adapted to receive the cartridge. The external spring device is compressed during insertion of the cartridge into the electronic device.

The cartridge may further comprise a movable wall slidingly disposed within the outer casing of the cartridge. The movable wall can have a wiper that presses against the outer casing to form a seal with the outer casing. The movable wall is in contact with the fuel inside the cartridge. The outer casing can be coated with a friction reduction film, such as polytetrafluoroethylene (Teflon®), to facilitate the movement of the wiper along the outer casing. The energy-storing device can exert pressure on the movable wall to assist with the transport of fuel out of the cartridge.

The inner liner can also be colored to allow the user to determine visually the amount of remaining fuel inside the cartridge.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

As illustrated in the accompanying drawings and discussed in detail below, the present invention is directed to a fuel cartridge, which stores fuel cell fuels such as methanol and water, methanol/water mixture, methanol/water mixtures of varying concentrations or pure methanol Methanol is usable in many types of fuel cells, e.g., DMFC, enzyme fuel cell, reformat fuel cell, among others. The fuel cartridge may contain other types of fuel cell fuels, such as ethanol or alcohols, chemicals that can be reformatted into hydrogen, or other chemicals that may improve the performance or efficiency of fuel cells. Fuels also include potassium hydroxide (KOH) electrolyte, which is usable with metal fuel cells or alkali fuel cells, and can be stored in fuel cartridges. For metal fuel cells, fuel is in the form of fluid borne zinc particles immersed in a KOH electrolytic reaction solution, and the anodes within the cell cavities are particulate anodes formed of the zinc particles. KOH fuel is disclosed in United States published patent application no. 2003/0077493, entitled "Method of Using Fuel Cell System Configured to Provide Power to One or more Loads," published on Apr. 24, 2003, which is incorporated herein by reference in its entirety. Fuels also include a mixture of methanol, hydrogen peroxide and sulfuric acid, which flows past a catalyst formed on silicon chips to create a fuel cell reaction. Fuels also include aqueous sodium borohydride ($NaBH_4$) and water discussed above. Fuels further include hydrocarbon fuels, which include, but are not limited to, butane, kerosene, alcohol and natural gas, disclosed in United States published patent application no. 2003/0096150, entitled "Liquid Hereto-Interface Fuel Cell Device," published on May 22, 2003, which is incorporated herein by reference in its entirety. Fuels also include liquid oxidants that react with fuels. The present invention is, therefore, not limited to any type of fuels, electrolytic solutions, oxidant solutions or liquids contained in the cartridge. The term "fuel" as used herein includes all fuels that can be reacted in fuel cells, and includes, but is not limited to, all of the above suitable fuels, electrolytic solutions, oxidant solutions, liquids, and/or chemicals and mixtures thereof.

As used herein, the term "cartridge" or the term "fuel cartridge" includes, but is not limited to, disposable cartridges, refillable/reusable cartridges, cartridges that reside inside the electronic device, cartridges that are outside of the electronic device, fuel tanks, fuel refilling tanks, and other containers that store fuel.

Figure 1:
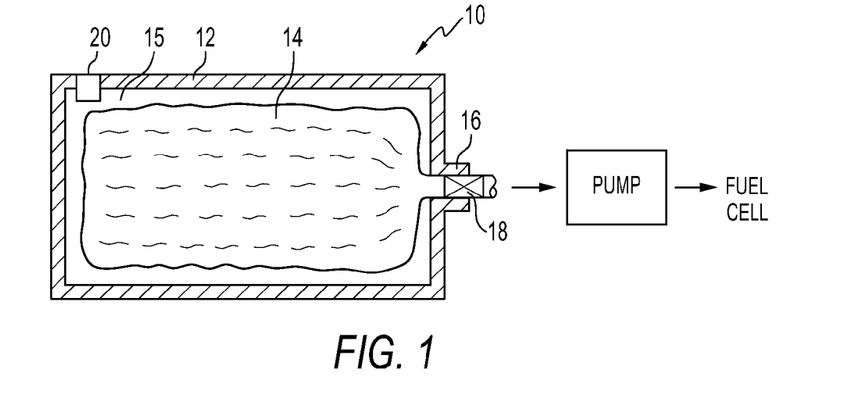
FIG. 1 is a partial cross-sectional view of a full multi-walled fuel cartridge showing an outer casing, an inner liner and a relief valve.
Figure 2:
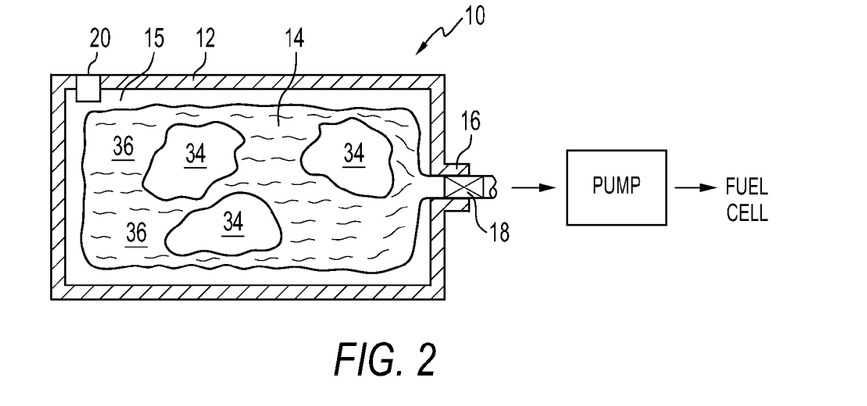
FIG. 2 is a partial cross-sectional view of the partially empty multi-walled fuel cartridge of FIG. 1.

As shown in FIG. 1, cartridge 10 comprises an outer tank, outer shell or outer casing 12 and an inner liner or inner bladder 14 containing fuel and disposed within outer casing 12. Spacing 15 is defined between outer casing 12 and inner liner 14. Inner liner 14 is preferably flexible and may be elastic, such that the volume inside liner 14 decreases when fuel is being transported from the liner. Cartridge 10 also comprises a nozzle 16 that houses a shut-off valve 18, which is in fluid communication with liner 14. Nozzle 16 is adapted to be connected to a fuel cell (not shown) or to a refilling fuel container/cartridge. An advantage of having a collapsible liner is that the liner collapses as the remaining fuel is transported toward nozzle 16, so that fuel is readily available to be transported to the fuel cell. Hence, cartridge 10 is usable in any orientation. Cartridge 10 may be sealed, except for shut-off valve 18, which is in fluid communication with the fuel cell. While a partial vacuum can develop within the sealed cartridge, a pump as illustrated in FIGS. 1 and 2 can transport the fuel out of the cartridge. Shut-off valve 18 can also be replaced by a porous material capable of transporting fuel through capillary or wicking action. Shut-off valves are fully discussed in commonly owned, co-pending patent application entitled "Fuel Cartridge with Connecting Valve," filed on the same day as the present application. This commonly owned patent application in incorporated herein by reference.

Figure 3A:
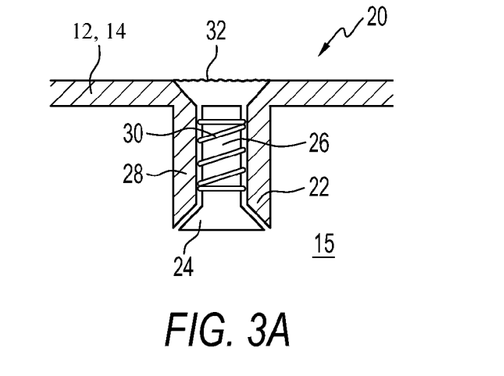
FIGS. 3A and 3B are partial cross-sectional views of two of the embodiments of the one-directional relief valve illustrated in FIGS. 1 and 2, which are useable with any of the multi-walled cartridges shown herein.
Figure 3B:
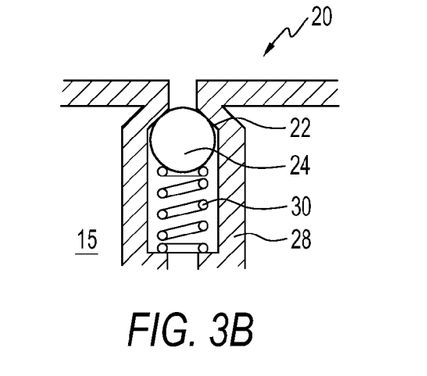

In accordance with one aspect of the present invention, cartridge 10 comprises a unidirectional relief valve 20, commonly known as a poppet valve or poppet-type valve. Valve 20 allows air to enter cartridge 10 intermittently to prevent buildup of a partial vacuum inside cartridge, as fuel is withdrawn from the cartridge. As shown in FIG. 3A, valve 20 comprises valve seat 22 adapted to provide a seal when valve head 24 is fully received therein or in a closed position. Valve head 24 is connected to optional valve stem 26, which is slidingly disposed within valve body 28. Valve head 24 and valve stem 26 are biased into a closed or seal position by spring 30. Spring 30 can be in compression or tension. The spring constant, k, of spring 30 is selected, such that when the pressure inside outer casing 12 or in spacing 15, drops below a predetermined level, valve 20 opens, i.e., valve head 24 moves into the body of the cartridge, as referenced in FIG. 3A, to let ambient air inside the cartridge through the spacing between head 24 and seat 22 and between valve stem 26 and valve body 28 to break the vacuum. Valve 20 does not maintain the internal pressure of cartridge 10 at a constant pressure, but allows the internal pressure to fluctuate or drop until a predetermined level is met. FIG. 3B shows another embodiment of poppet valve 20, wherein the same reference numbers designate valve elements that are similar to those of the embodiment of FIG. 3A.

Valve 20 may optionally have membrane 32 covering its opening to prevent dirt from entering the cartridge. Preferably, membrane 32 only allows air or other gases to enter or leave the cartridge, and keeps liquid from entering or leaving the cartridge. Such gas permeable, liquid impermeable membrane is disclosed in commonly owned, co-pending patent application Ser. No. 10/356,793, entitled "Fuel Cartridge for Fuel Cells," filed on Jan. 31, 2003, in U.S. Pat. No. 3,508,708, entitled "Electric Cell with Gas Permeable Vent Stopper," issued on Apr. 21, 1970, and in U.S. Pat. No. 4,562,123, entitled "Liquid Fuel Cell," issued on Dec. 31, 1985. The disclosures of these references are incorporated herein by reference in their entireties. Alternatively, membrane 32 can be used without valve 20. Such membranes can be made from polytetrafluoroethylene (PTFE), nylon, polyamides, polyvinylidene, polypropylene, polyethylene or other polymeric membrane. A commercially available hydrophobic PTFE microporous membrane can be obtained from W.L Gore Associates, Inc. Goretex® is a suitable membrane. Goretex® is a microporous membrane containing pores that are too small for liquid to pass through, but are large enough to let gas through.

Membrane 32 can be replaced by filler materials, such as those disclosed in the '793 patent application. As used herein, filler materials include foam. Filler materials retain liquids and allow gases to pass through. A suitable filler material is the absorbent material used in diapers. Preferably, these filler materials also swell when absorbing liquid, and become less permeable to liquid.

Valve 20 is usable with the multi-walled cartridges disclosed herein, and with single walled cartridges, such as those disclosed in commonly owned, co-pending '793 application. Unidirectional relief valve is also disclosed in the '793 application.

As shown in FIG. 2, as fuel is withdrawn from inner liner 14, the walls of the liner can collapse toward each other and may form contact areas 34. Contact areas 34 can prevent trapped fuel 36 from reaching nozzle 16 to be transported to the fuel cell. To keep inner liner 14 relatively open while remaining fuel is being withdrawn, an insert can be placed within liner 14 as shown in FIGS. 4-8. Preferably, the insert is also flexible so that it allows the liner to collapse thereby facilitating the selective release of fuel.

Figure 4:
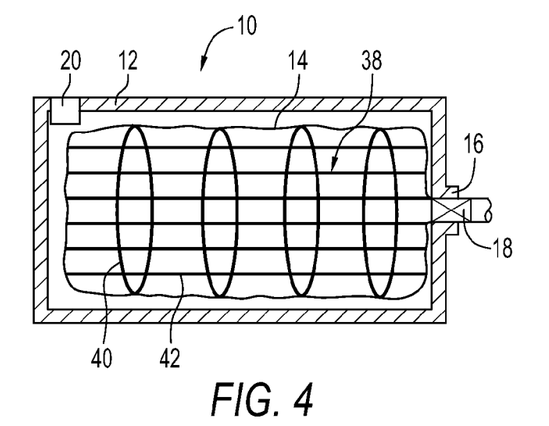
FIG. 4 is a partial cross-sectional view of another full multi-walled fuel cartridge showing an inner liner with internal structures.
Figure 5:
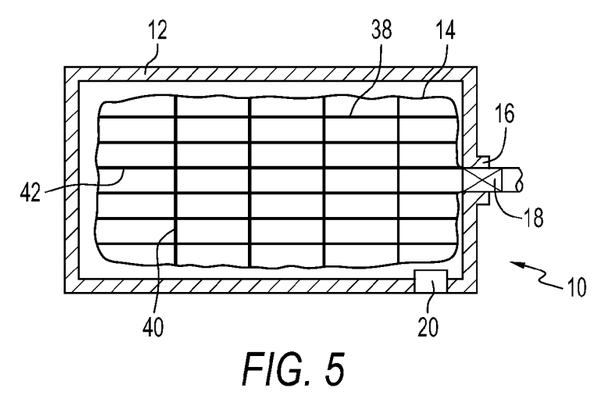
FIG. 5 is a partial cross-sectional view of the partially empty multi-walled fuel cartridge of FIG. 4.
Figure 6A:
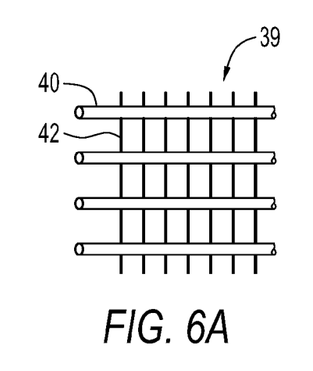
FIGS. 6A-6C are enlarged sectional views of suitable inserts for use in the inner liner.
Figure 6B:
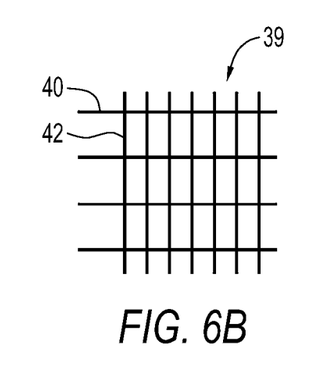

The insert can be matrix 38 having ribs 40, 42. Matrix 38 prevents the walls of liner 14 from collapsing on itself, as shown in FIG. 4 when the liner is full and in FIG. 5 when the liner is at least partially empty. Ribs 40, 42 may be thick or thin, as shown in FIGS. 6A and 6B, and can be solid or hollow or made out of open cell foam. Ribs 40 can be substantially rigid and ribs 42 can be flexible to facilitate the shrinkage or collapse of liner 14, by allowing ribs 42 to collapse. Alternatively, both ribs 40 and 42 are flexible, and both can collapse along with liner 14. Hollow or foam ribs are preferred due to their minimal volume and lightweight and that fuel can flow through them to nozzle 16. Alternatively, ribs 40, 42 and/or matrix 38 can be made integral to liner 14 by conventional manufacturing processes.

Figure 6C:
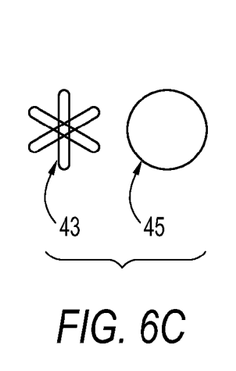
Figure 7:
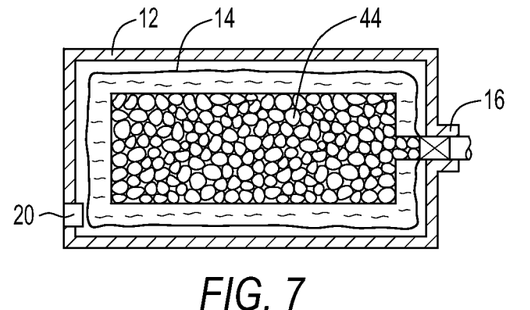
FIG. 7 is a partial cross-sectional view of another multi-walled fuel cartridge showing another integral structure.
Figure 8:
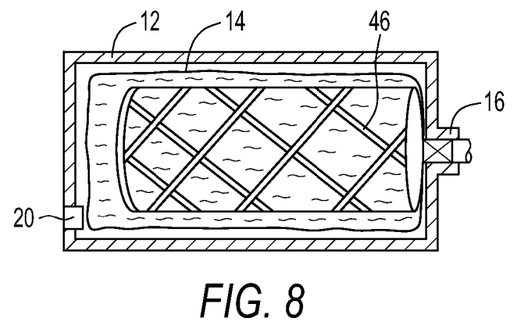
FIG. 8 is a partial cross-sectional view of another multi-walled fuel cartridge showing another integral structure.

In accordance with another aspect of the present invention, the insert can be foam insert 44, as shown in FIG. 7, which preferably has a shape substantially similar to the shape of inner liner 14. In other words, the shape of the insert may depend on the shape of the liner. If foam is used, preferably foam insert 44 is a thin sheet of open cell foam. Insert 38 may also be mesh insert 46, as shown in FIG. 8, or may comprise a plurality of wicking twines or yarns, such as candlewicks. Alternatively, the insert can be made from filler materials to help transport fuel to nozzle 16 through capillary or wicking action. Additionally, the insert may comprise particles, such as spheres 45 or jacks 43 as shown in FIG. 6C. These particles may be connected to each other or they may be loose. Shut-off valve 18, a filter, a screen or the like can prevent the loose particles from exiting the cartridge. The insert can also be interlocking, substantially rigid rods, such as a chain-link fence that can collapse on to itself when the liner empties.

Figure 9:
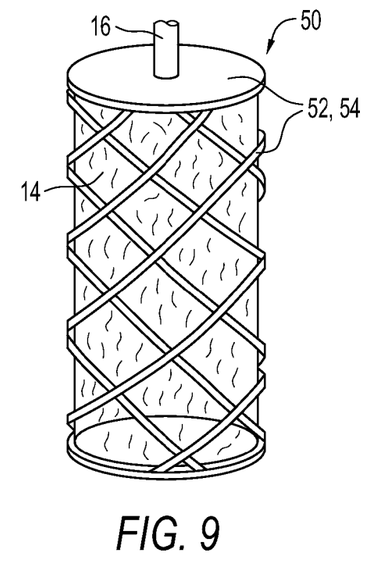
FIG. 9 is a perspective view of another multi-walled fuel cartridge with an open outer casing and an inner liner.
Figure 10:
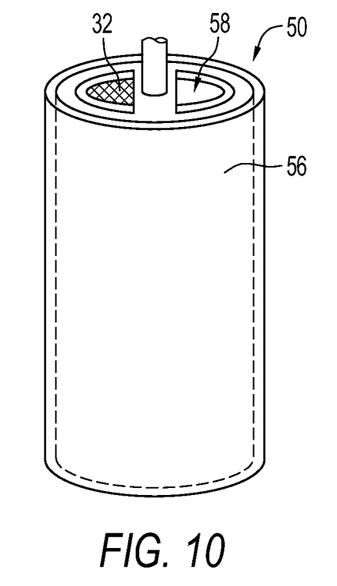
FIG. 10 is a perspective view of another multi-walled fuel cartridge with an open outer casing and an inner liner.
Figure 11A:
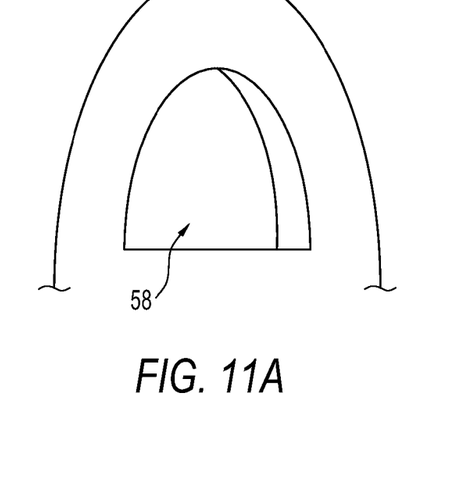
FIGS. 11A and 11B are enlarged views of a section of the multi-walled fuel cartridge of FIG. 10.
Figure 11B:
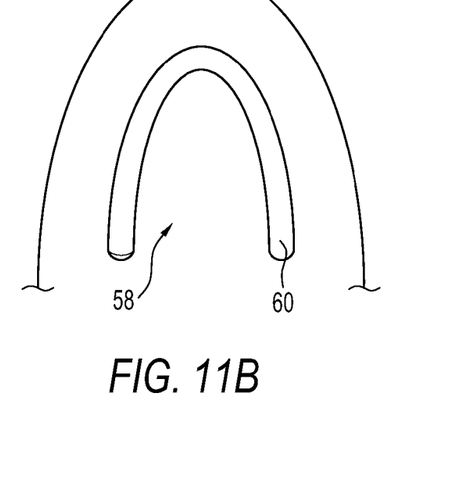

The outer casing can also have an open structure as shown in FIGS. 9 and 10. Fuel cartridge 50 comprises open outer casing 52 and inner liner 14, as described above, and nozzle 16 containing shut-off valve 18 (not shown). Open outer casing 52 can be substantially open, such as open mesh 54 or can be substantially closed, such as container 56. Air can freely enter cartridge 50 to prevent a partial vacuum from forming inside the cartridge through the openings in mesh 54 or through holes 58 defined on top of container 56 or on any other location on the cartridge. Open outer casing 52 has reduced weight while maintaining structural integrity of the cartridge. The openings in mesh 54 and holes 58 can be made relatively small to limit access to the inner liner. Mesh 54 and holes 58 may be covered with air permeable, liquid impermeable membrane 32 to prevent leakage from the cartridge in the event that the inner liner is breached. If holes 58 are sufficiently small, they may be covered by filler materials that could absorb liquid and minimize leakage. Preferably, these filler materials also swell when absorbing liquid, and become less permeable to liquid. Also, as shown in FIGS. 11(A) and 11(B) hole 58 may have lid 60 to limit access to the inner liner. Membrane 32 may be a part of lid 60.

Figure 12A:
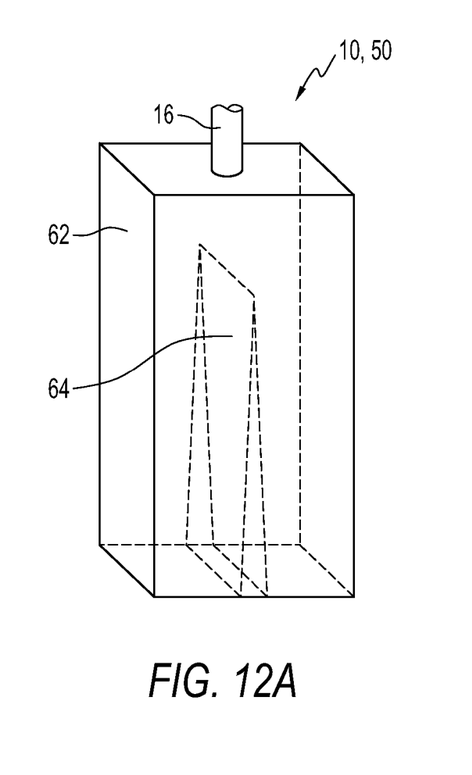
FIGS. 12A and 12B are perspective views of an outer casing and inner liner of another multi-walled cartridge.
Figure 12B:
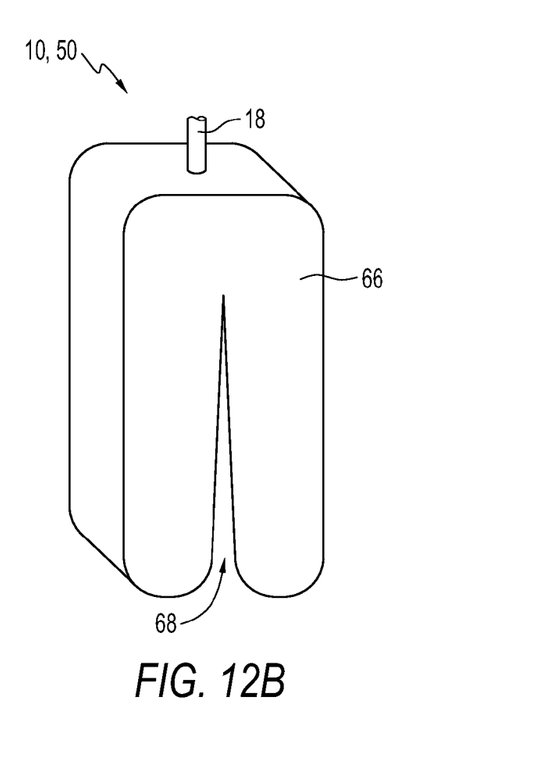

Additionally, as shown in FIGS. 12(A) and 12(B), fuel cartridge 10, 50 may have round or square cross section or any other shape. Fuel cartridge 10, 50 may also have outer casing 62 with internal support 64, similar to the fuel tank of a pocket butane lighter, and inner liner 66 with slit 68. Inner liner 66 is shaped and dimensioned to be received within outer casing 62.

In accordance with another aspect of the present invention, the fuel cartridge is adapted to receive liquid and/or gaseous byproducts with or without suspended solids produced by the fuel cell reaction. For illustration purpose, this aspect of the present invention is primarily described using the direct methanol fuel cell reaction. The present invention, however, can be used to receive such byproducts from any fuel cells, including but not limited to those described herein, and the present invention is not limited to any particular fuels or byproducts.

Figure 13:
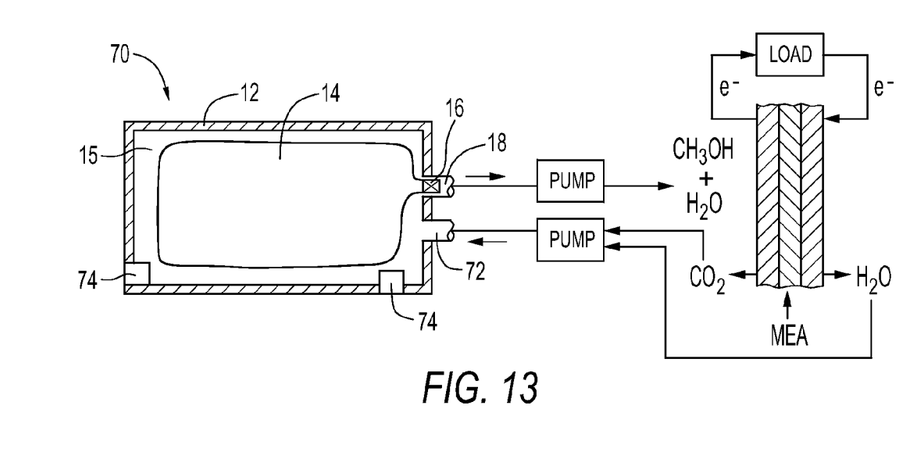
FIG. 13 is a schematic view of another multi-walled cartridge and the fuel cell.

As shown in FIG. 13, cartridge 70 comprises outer casing 12 and inner liner 14, as described above. Outer casing 12 also comprises nozzle 16 which houses shut-off valve 18, which is in fluid communication with liner 14, also as described above. The fuel ($CH_3OH+H_2O$) is pumped or flowed by other means out of nozzle 16 to react at the membrane electrode assembly (MEA). Carbon dioxide and water ($CO_2+2\ H_2O$) are produced by the MEA and are pumped back to cartridge 70 at intake nozzle 72. The $CO_2$ and excess $H_2O$ byproducts can be stored at least initially in spacing 15 between outer casing 12 and inner liner 14. Since the volume of $CO_2$ and $H_2O$ is most likely more than a cartridge of reasonable size can store, cartridge 70 also comprises at least one outlet relief valve 74. The $CO_2$ and $H_2O$ byproducts can also flow back to the cartridge without pumping due to $CO_2$ gas. Nozzles 16 and 72 can be located anywhere on the cartridge, and they can also be located co-axially to each other.

Figure 14:
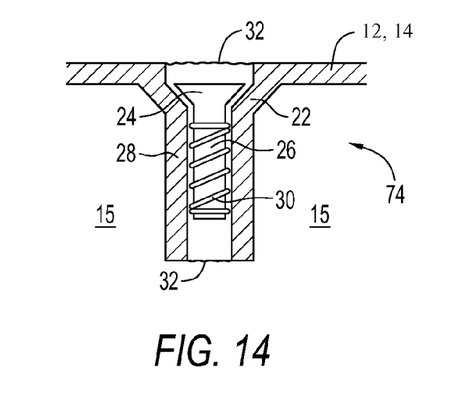
FIG. 14 is a cross-sectional view of another one-directional relief valve.

Outlet relief valve 74, as shown in FIG. 14, is substantially similar to relief valve 20 discussed above, with the exception that it is aligned in the reverse orientation. Valve 74 also has valve seat 22 adapted to provide a seal when valve head 24 is fully received therein or in a closed position. Valve head 24 is connected to optional valve stem 26, which is slidingly positioned within valve body 28. Valve head 24 and valve stem 26 are biased into a closed or seal position by spring 30. Spring 30 can be in compression or tension. The spring constant, k, of spring 30 is selected such that when the pressure inside outer casing 12 or in spacing 15, caused by the $CO_2$ and $H_2O$ byproducts rises to a predetermined level, valve 74 opens, i.e., valve head 24 moves away from the cartridge, as referenced in FIG. 14, to let $CO_2$ inside the cartridge vent through the spacing between head 24 and seat 22 and between stem 24 and body 28 to reduce the internal pressure of the cartridge. Hence, valve 74 does not maintain the internal pressure of cartridge 70 at a constant pressure, but allows the internal pressure to fluctuate or rise until a predetermined level is met and then vents the $CO_2$ to relieve the pressure.

Valve 74 preferably has membrane 32 covering its outlet and/or its entrance to prevent water from leaving the cartridge. As discussed above, membrane 32 only allows air or other gases to enter or leave the cartridge, and keeps liquid from entering or leaving the cartridge.

Alternatively, valve 74 may have filler materials, as discussed above, covering its outlet to absorb water and allow gases to leave the cartridge. More than one valve 74 may be installed on outer casing 12.

Alternatively, valve 74 may be omitted if open structure outer casing 52 with membrane 32 or filler materials covering the openings is used with the fuel cartridge. Outer casing 52 and the covering membrane or filler materials 32 continually allow $CO_2$ gas byproduct to escape while retaining water byproduct inside the cartridge.

The cartridge may also have both valves 20 and 74 disposed on the cartridge's outer wall to allow ambient air to enter to prevent partial vacuum and/or to vent $CO_2$ to prevent pressure buildup. Alternatively, the functions of valves 20 and 74 are incorporated into a single valve, i.e., a valve that allows ambient air to enter the cartridge to relieve vacuum buildup and allows gases to leave the cartridge to relieve pressure buildup.

Valve 74 may be omitted if the byproducts contain only liquids. For example, the sodium borohydride and water fuel system produces aqueous sodium borate and water as the byproducts. Additionally, spacing 15 can be used to store fuel while inner liner 14 can be used to store the liquid byproducts.

Figure 15:
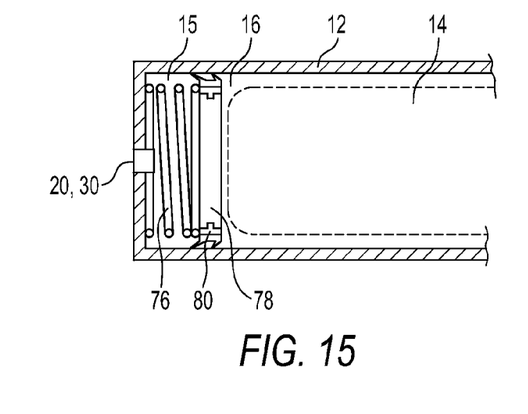
FIG. 15 is a partial cross-sectional view of another aspect of the present invention.

As shown in FIG. 1, a pump external to the cartridge is used to transport the fuel out of the cartridge. Alternatively, cartridge 10 can be pressurized to drive the fuel to the fuel cell. As shown in FIG. 15, spacing 15 may have an energy-storing device, such as a compressed spring or compressed foam, designated as 76, pushing inner liner 14 or pushing intermediate movable wall 78 located between the compressed foam/spring and inner liner 14. Relief valve 20 and/or membrane 32 can be provided to prevent a partial vacuum from forming inside the cartridge. Spacing 15 can also be filled with a compressed gas, such as butane, n-butane or propane, or liquid propane to compress inner liner 14. An advantage of using compressed gas is that no relief valve or gas permeable membrane is needed to prevent a partial vacuum from forming inside the cartridge. Alternatively, the partial vacuum that can form inside a sealed cartridge as fuel is pumped may pull intermediate wall 78 toward nozzle 16.

Figure 16:
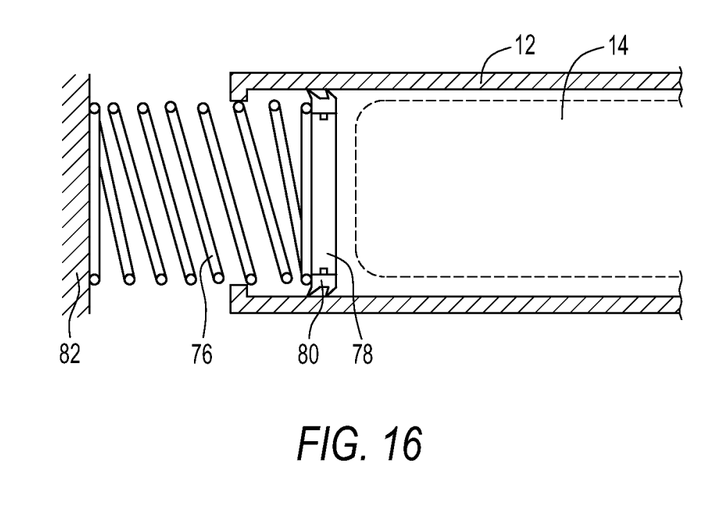
FIG. 16 is a partial cross-sectional view of another aspect of the present invention.

Furthermore, as shown in FIG. 16, spring 76 may be biased against wall 82 of the electronic device. In this embodiment, spring 76 resides in the electronic device or in the fuel cell. When a new fuel cartridge is loaded in the device, it compresses spring 76, and spring 76 then exerts a force on the cartridge while the cartridge is inside the electronic device. Preferred spring materials that are not in contact with fuel include, but are not limited to, Inconel® nickel-chromium-iron alloy, stainless steel or high fluorine fluorocarbon content elastomers.

Intermediate movable wall 78 preferably comprises wiper 80 and is sized and dimensioned to slide along the inside surface of outer casing 12. Movable wall 78 preferably contacts and pushes inner liner 14. In accordance with another aspect of the present invention, movable wall 78 also forms an optional seal with the inside surface of outer casing 12, so that inner liner 14 may be omitted and the fuel is in direct contact with movable wall 78 and outer casing 12. Wiper 80 is preferably made from an elastic polymer, such as ethylene propylene diene methylene terpolymer (EPDM) or Vitron® fluoro-elastomer, and is compressed against outer casing 12 to provide a seal therewith. The inner surface of outer casing 12 can also be coated with a friction reducing film, such as polytetrafluoroethylene or Teflon®, or a lubricant coating to facilitate the sliding between movable wall 78 and outer casing 12.

The pumps usable with any of the embodiments discussed herein can be any pumps capable of transporting fluid at the desired rate. Suitable pumps include microelectromechanical pumps (MEMS), such as those discussed and claimed in the '793 patent application. The MEMS pump can be either a field-induced pump or a membrane-displacement pump. A field-induced pump has an AC or DC electrical field or magnetic field applied to the fuel/liquid to pump the fuel/liquid. Suitable field-induced pumps include, but are not limited to, electrohydrodynamic pump, magnetohydrodynamic pump and electro-osmotic pump. The electrohydrodynamic pump and an electro-osmotic pump can be used together. A membrane-displacement pump comprises a membrane and a force is applied to the membrane causing the membrane to move or vibrate to pump the fuel. Suitable membrane-displacement pumps include, but are not limited to, electrostatic pump, piezoelectric pump and thermopneumatic pump. The MEMS pump controls the speed of the flow of fuel and reverses the flow, as well as stopping the flow.

Additionally, inner liner 14 may be colored to allow the user to visually gage the fuel level within the cartridge. Most preferably, inner liner 14 is thin and made from a durable and flexible material so that it efficiently collapses or reduces its volume, as fuel is withdrawn. Preferred materials for the liner include natural rubber, polyethylene (including low density to high density PE), ethylene propylene (EP), EPDM and other thin polymeric films. Preferably the polyethylene is fluorinated and is substantially free of metal ions to ensure low permeation. The polyethylene can be laminated with a vapor barrier layer, such as aluminum foil or fluorine treated plastics, to reduce methanol permeation.

Another suitable liner material is compressed, exfoliated graphite due to graphite's resistance to corrosive fuel cell fuels, such as methanol, and due to compressed, exfoliated graphite's impermeability to gases. Typically, graphite in its unaltered form is intercalated to insert atoms or molecules in the inter-planar spaces between the layered planes. The intercalated graphite is then expanded or exfoliated by sudden exposure to high heat to expand the inter-planar spacing between the layered planes. The expanded or exfoliated graphite is then compressed to form a very thin foil or sheets. Such compressed exfoliated graphite foils or sheets are flexible and possess high tensile strength. Compressed, exfoliated graphite is disclosed in U.S. Pat. No. 3,404,061, and the disclosure of the '061 patent is incorporated herein by reference in its entirety. Compressed graphite foils are commercially available under the tradename GRAFOIL®, with thickness in the range of 3 mils to 600 mils, from Graftech, Inc, located in Lakewood, Ohio.

Inner liner 14 can be made from multi-ply or multi-layer materials. The innermost layer is compatible with the fuel cell fuels, i.e., resistance to the fuel, and has low permeability. The middle layer is a barrier to fuel cell fuels or is impermeable. The outermost layer may be another barrier layer, and can be resistant to the fuel. In one example, innermost layer can be fluorine treated polyethylene (LDPE or HDPE), the middle layer can be nylon or silicane and the outer layer can be an aluminum foil.

The multi-layer material may be co-extruded and pleated to make the liner. Edges of the liner can be sealed by heat generated by radio frequency, ultrasonic or heat sources. The liner can also be shrink-wrapped in aluminum foil. This prolongs the shelf life of the cartridge, since the innermost layer can withstand the fuel's corrosive effect and the middle and outer layers provide barriers to keep the fuel inside the liner and the outer layer prevents ultraviolet light from degrading the liner.

Inner liner 14 may be used without outer casing 12. In accordance with yet another aspect of the present invention, outer casing 12 can also be flexible to be compressed along with inner liner 14, as fuel is transported from the cartridge. Strong flexible outer casing can provide additional structural support to inner liner 14, while obviating the need for valve 20 or membrane 32 to prevent partial vacuum buildup.

The outer casing is preferably made from polyacetal resin, which can be injection molded or extruded. The outer casing is preferably free of contaminants such as zinc, sulfur, talc and oils, and should be treated with fluorine to minimize permeation.

Cartridge 10 may also have multiple inner liners 14. In one example, cartridge 10 may have a first inner liner 14 for pure methanol and a second inner liner 14 for water for use with a direct methanol fuel cell or a methanol reformat fuel cell. In another example, cartridge 10 may have a first inner liner 14 for methanol and a second inner liner for hydrogen peroxide and an optional third inner liner 14 for sulfuric acid. In another example, cartridge 10 may have a first inner liner 14 for sodium borohydride and a second inner liner for water. An inner liner can also be used to store liquid byproducts, such as water or aqueous sodium borate.

Additionally, inner liner 14 is refillable and can be refilled through valve 18. Alternatively, liner 14 may have a separate refilling valve, similar to shut-off valve 18. Liner 14 can also be made from a stretchable or elastic material so that the liner may expand when the internal pressure reaches a predetermined level. Additionally, liner 14 can have a relief valve 20 (FIG. 3A) or 74 (FIG. 14) disposed thereon to release pressure when the internal pressure reaches a predetermined level.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

We claim:

1. A fuel cartridge connectable to a fuel cell comprising:
an outer casing and an inner flexible liner containing fuel for the fuel cell, wherein the inner flexible liner comprises a mesh insert integral with the inner liner to keep the inner liner relatively open while fuel is being withdrawn, and wherein the insert is flexible, and
wherein the inner flexible liner comprises a gas passable member disposed on the inner flexible liner.

2. The fuel cartridge of claim 1, wherein the inner liner is connected to a shut-off valve and the fuel is transported through the shut-off valve to the fuel cell.

3. The fuel cartridge of claim 2, wherein the shut-off valve is disposed within a nozzle connected to the outer casing.

4. The fuel cartridge of claim 1, wherein a surface area of the insert is substantially similar to a surface area of the liner.

5. The fuel cartridge of claim 1, wherein the liner is made from fluorinated polyethylene.

6. The fuel cartridge of claim 1, wherein the gas passable member comprises a gas permeable, liquid impermeable membrane.

7. The fuel cartridge of claim 1, wherein the gas passable member comprises a relief valve.

* * * * *